United States Patent
Kennedy et al.

(10) Patent No.: US 8,207,842 B2
(45) Date of Patent: Jun. 26, 2012

(54) ASSIGNMENT OF ALARMS

(75) Inventors: Magnus Kennedy, Sövde (SE); Bo Lincoln, Lund (SE); Fredrik Tibblin, Staffanstorp (SE); Jonas Bülow, Malmö (SE); Camilla Andersson, Löddeköpinge (SE); Joakim Kvarnlöv, Helsingborg (SE); Jan Aarni, Skurup (SE); Anders Jakobsson, Malmö (SE); Joakim Karlsson, Klågerup (SE)

(73) Assignee: Schneider Electric Buildings AB, Malmö (SE)

( * ) Notice: Subject to any disclaimer, the term of this patent is extended or adjusted under 35 U.S.C. 154(b) by 562 days.

(21) Appl. No.: 12/487,123

(22) Filed: Jun. 18, 2009

(65) Prior Publication Data

US 2009/0322509 A1 Dec. 31, 2009

(30) Foreign Application Priority Data

Jun. 19, 2008 (EP) .................................... 08158600

(51) Int. Cl.
*G08B 23/00* (2006.01)
*G08B 29/00* (2006.01)
*G06F 3/00* (2006.01)

(52) U.S. Cl. ........ 340/517; 340/500; 340/506; 340/525; 700/17; 700/83; 719/318

(58) Field of Classification Search .................. 340/517, 340/506

See application file for complete search history.

(56) References Cited

U.S. PATENT DOCUMENTS

| | | | |
|---|---|---|---|
| 6,463,387 B1 * | 10/2002 | Runnestrand et al. | 702/16 |
| 7,058,957 B1 * | 6/2006 | Nguyen | 719/318 |
| 2002/0055790 A1 | 5/2002 | Havekost | |
| 2005/0097569 A1 * | 5/2005 | Chandrasekaran | 719/318 |
| 2005/0219044 A1 | 10/2005 | Douglass et al. | |
| 2006/0047558 A1 * | 3/2006 | Uchiyama et al. | 705/9 |
| 2008/0091664 A1 * | 4/2008 | Bangel et al. | 707/3 |

FOREIGN PATENT DOCUMENTS

WO    WO 00/72285 A1    11/2000

OTHER PUBLICATIONS

"Take Control of Your Alarms: A Cost-Effective Solution for Managing Regional Networks," White Paper from DPS Telecom, Oct. 4, 2005, retrieved from the Internet: http://www.dpstele.com/pdfs/white_papers/regional_network_management.pdf, 12 pages.
European Search Report for EP 08 15 8600, completed Nov. 10, 2008.

* cited by examiner

*Primary Examiner* — Donnie Crosland
(74) *Attorney, Agent, or Firm* — Buchanan Ingersoll & Rooney PC

(57) ABSTRACT

There is provided a method for monitoring a building control device, the method comprising associating the building control device with an event; storing the event and at least one parameter of the building control device in a database, wherein the database is operatively connected to a plurality of operator devices, and wherein the at least one parameter at least pertains to defining the event to be one from the group of unassigned, pending, or assigned by the plurality of operator devices; traversing, by at least a first of the plurality of operator devices, the database subject to the at least one parameter.

20 Claims, 6 Drawing Sheets

```
Struct EVENT MESSAGE
(   device_ID,
    event_type,
    time,
    status,
    operator_1(ID,
               assignment_time,
               response),
    operator_2(ID,
               assignment_time,
               response),
)
```

*Fig. 4*

ASSIGNMENT OF ALARMS

TECHNICAL FIELD

The present invention relates to a method and a computer program for, in a building control system, detecting, determining and handling events.

BACKGROUND

It is common to control different systems, such as control systems for heating, ventilation and air conditioning (HVAC), security, lighting, asset management or other facility management control systems, in various kinds of buildings.

It is important that the building control system, for example, maintains a desired state such as a specific temperature or airflow, monitors that no unauthorized access occurs and so on. However, occasionally the desired state is not maintained, e.g. in case of failure in a temperature or airflow regulating component or in case of improper handling, or triggering of the access control system. When the desired state is not maintained an alarm is usually sent to, or generated by, a computer server that monitors the building control system. The alarm must in most cases be attended to by maintenance personnel in order to overcome the reason for the alarm.

The international patent application WO 00/72285 discloses a system and method for monitoring and handling alarms released at a remote equipment such as HVAC equipment. A sensor is in communication with a piece of remote equipment and an interface unit that has a message generating mechanism is capable of receiving signals from the sensor. A central computer server is in communication with the interface unit from a variety of different data transports. When a sensor detects an exception condition, or an alarm, in a piece of remote equipment, the sensor transmits a signal to the interface unit, and the interface unit generates an incoming exception message and forwards the message to the server. The server forwards at least one outgoing exception message to at least one predetermined user-defined communication device based on the incoming exception message. Multiple outgoing exception messages may be forwarded to multiple communication devices in accordance with a user-defined message profile, or a single outgoing exception message may be forwarded in response to receipt of multiple incoming exception messages. The message profile is remotely configurable by the user.

SUMMARY OF THE INVENTION

Alarms and other events are often of different categories and/or severity; some must immediately be attended to while others do not need immediate attention. It is desirable that no alarms are forgotten and that the distribution of alarms to maintenance, security and service personnel is efficiently handled.

In light of the present invention a number of deficiencies of the prior art have been identified. For example, even though prior art is capable of directing alarms to specific devices and individuals, each alarm has per se no connection to an operator, which is desirable if the alarm shall be properly handled, particularly in respect of handling the alarm within a reasonable time.

In view of the foregoing, it is thus an object of the present invention to provide an improvement of the prior art. More particularly, it is an object to provide a method and a computer program for efficient handling of events, such as alarm events, in a building control system.

Hence, according to a first aspect a method is provided for monitoring a building control device, wherein the method comprises associating the building control device with an event; storing the event and at least one parameter of the building control device in a database, wherein the database is operatively connected to a plurality of operator devices, and wherein the at least one parameter at least pertains to defining the event to be one from the group of unassigned, pending, or assigned by the plurality of operator devices; traversing, by at least a first of the plurality of operator devices, the database subject to the at least one parameter; and in a case the first of the plurality of operator devices detects an unassigned event: defining the event to be pending; requesting at least a second of the plurality of operator devices to accept assignment of the pending event; in a case the second of the plurality of operator devices accepts assignment of the pending event defining the event to be assigned; and in a case the second of the plurality of operator devices rejects assignment of the pending event defining the event to be unassigned.

This method is advantageous in that at least a first operator device traverses the database comprising details regarding events of building control devices in a system of building control devices, and wherein upon detection of an unassigned event the at least first operator device requests at least a second operator device to be assigned to the event. That is, such a method reduces the risk of an event to remain unassigned, or unattended. The assignment of an event with a specific operator device thus creates an association between said specific operator device and the event.

In a case where the second of the plurality of operator devices rejects assignment of the pending event, the method may further comprise ordering the plurality of operator devices in an ordered list of additional devices, wherein the ordered list reflects a hierarchical structure of the plurality of operator devices; assigning a third of the plurality of operator devices to be a current device, wherein the third of the plurality of operator devices is the next device following the second of the plurality of operator devices in the ordered list, and associating an operator identification parameter of the current device with the pending event; sending the message and the request pertaining to acceptance of the pending event from the second of the plurality of operator devices to the current device associated with the current operator identification parameter; and while the current device rejects assignment of the pending event: assigning the current device to be a previous device; assigning the next device in the ordered list of additional devices to be the current device and associating the operator identification parameter of the current device with the message; and sending the message and the request pertaining to acceptance of the pending event from the previous device to the current device.

The disclosed method provides for assuring that the event is handled by another operator device, in case neither the first operator device nor the second operator device attend to the event. That is, such a method further reduces the risk of an event to remain unassigned, or unattended. The list can be ordered according to a number of parameters, such as the type of event, the type of building control device, the geographical location of the event, which operator device(s) that have previously been assigned to the event.

The method may further comprise associating the pending event with a predetermined condition parameter. The predetermined condition may further comprise a lapsed time interval. Thus the alarm message may be sent to a second operator device if the first operator device, for example, does not attend to the event within a specific time. This is advantageous in that the risk of an event being unassigned, or unattended to for a longer period of time is reduced.

The method may further comprise sending, from at least one of the plurality of operator devices, a message indicative of at least one from the group of an operator's acceptance of the pending event, and an operator's rejection of the pending event, to the database. This allows (a first operator of) a first operator device, to redirect the message to (a second operator of) a second operator device.

The method may further comprise storing, in the database, information comprising the operator's acceptance or rejection of the pending event. This provides efficient handling of messages. For example, if an operator device has rejected acceptance of the event the request for acceptance does not need to be sent again to this operator device within a specific time frame.

The method may further comprise storing, in the database, information comprising the association of the operator identification parameter with the pending event. This provides efficient handling of messages. In addition, such information can be used later when a new event occurs at the building control device to which the pending event pertains.

The method may further comprise displaying the message only on a communication device associated with an identification parameter that was associated with the message. This means that events may be hidden from operators or devices which are not associated with handling the event. This reduces the information flow in the system, since messages do not need to be communicated to all communication devices in the system.

The method may further comprise monitoring the association of the first operator identification parameter with the message, until the pending event is assigned. This allows for connecting the event associated with the messages with an operator as long as the event is unattended to or unassigned.

The method may further comprise sending, from at least one of the plurality of operator devices, a message indicative of measures taken in relation to the event, to the database. The method may further comprise storing, in the database, information indicative of the measures taken. This provides for a later analysis of how the event associated with the messages has been handled.

The alarm message may be represented by a data structure comprising at least one from the group of the operator identification parameter, a reference to the operator identification parameter, and a pointer to the operator identification parameter. This simplifies the implementation of the proposed method.

According to a second aspect of the invention, there is provided a computer program stored on a computer readable medium, which comprises software instructions that, when executed in a computer, performs a method for monitoring a building control device according to the above Such a computer program enables for efficient implementation of the method for monitoring a building control device as disclosed above.

According to a third aspect of the invention, there is provided a method in a first operator device for monitoring a building control device, wherein the building control device is associated with an event, the event and at least one parameter of the building control device is stored in a database, the database is operatively connected to a plurality of operator devices, and wherein the at least one parameter at least pertains to defining the event to be one from the group of unassigned, pending, or assigned by the plurality of operator devices, the method comprising traversing the database subject to the at least one parameter; and in a case an unassigned event is detected: defining the event to be pending; requesting at least a second of the plurality of operator devices to accept assignment of the pending event; in a case the second of the plurality of operator devices accepts assignment of the pending event defining the event to be assigned; and in a case the second of the plurality of operator devices rejects assignment of the pending event defining the event to be unassigned.

Such a method has the same advantages as the method for monitoring a building control device as disclosed above.

According to a fourth aspect of the invention, there is provided a computer program stored on a computer readable medium, which comprises software instructions that, when executed in a computer, performs a method in a first operator device for monitoring a building control device.

Such a computer program enables for efficient implementation of the method in a first operator device for monitoring a building control device as disclosed above.

The second, third and fourth aspects may generally have the same features and advantages as the first aspect Generally, all terms used in the claims are to be interpreted according to their ordinary meaning in the technical field, unless explicitly defined otherwise herein. All references to "a/an/the [device, event, message, alarm, parameter, step etc.]" are to be interpreted openly as referring to at least one instance of said device, event, message, alarm, parameter, step etc., unless explicitly stated otherwise. The steps of any method disclosed herein do not have to be performed in the exact order disclosed, unless explicitly stated.

BRIEF DESCRIPTION OF THE DRAWINGS

Embodiments of the present invention will now be described, by way of example, with reference to the accompanying schematic drawings, in which FIG. 4 illustrates pseudo-code according to an embodiment.

DETAILED DESCRIPTION OF PREFERRED EMBODIMENTS

Figure 1A:
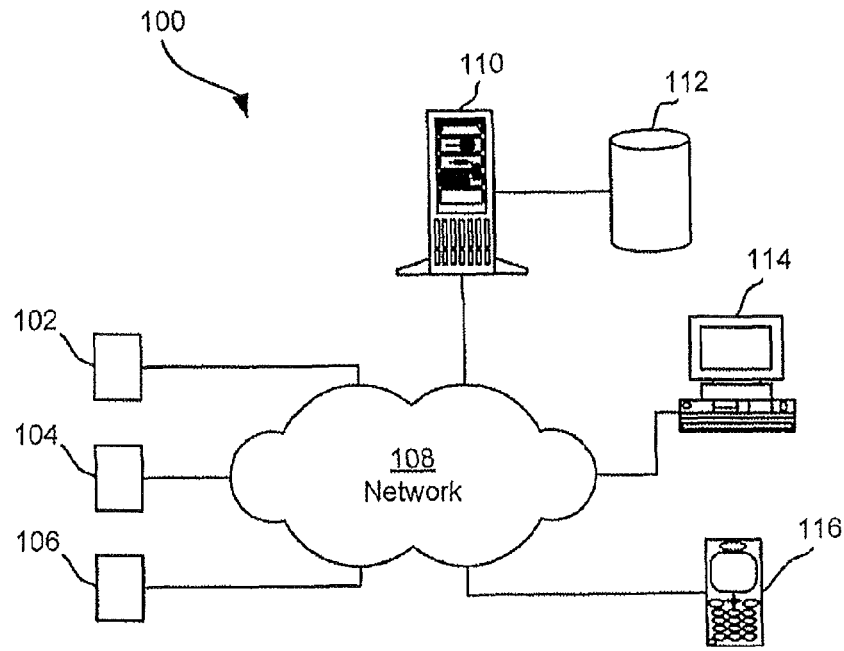
FIG. 1a is a schematic view of a system according to an embodiment.

A system 100 according to an embodiment is illustrated in FIG. 1a. The system 100 will be described in an operating state. The system 100 comprises a computer server 110 operatively connected to a database 112. The computer server 110 is further operatively connected to a communications network 108. The communications network 108 may be an internal network (a so called Intranet) of a building, of a collection of buildings, of a company, of a business enterprise, or the like. The communications network 108 may also be a wide area network. The communications network 108 may be wired, wireless, or any combinations thereof.

A plurality of operator devices 114, 116 are also operatively connected to the network 108. The operator devices 114, 116 may be associated with operators, such as maintenance personnel; they may be fully automated capable of handling events independently of operators, or any combination thereof. For example, some functionalities associated with the operator devices 114, 116 may be automated whilst some functionalities associated with the operator devices 114, 116 may require operation by maintenance personnel. In the illustrative example of FIG. 1a the plurality of operator devices comprise a computer 114, which may be a stationary computer or a laptop computer or the like, and a portable communications device 116, which may be a portable digital assistant (PDA), a mobile phone or the like.

Moreover, a plurality of building control devices 102, 104, 106 are operatively connected to the same communications network 108. Each of the control devices 102, 104, 106 is a control device typical and common for sensing different events or parameters when controlling various sub-systems in a building control system.

For example, a first sub-system may be a temperature control system which regulates the temperature in a room in the building, in which case the control devices 102, 104, 106 comprise temperature sensors and various control means for detecting e.g. if a measured temperature is within a desired temperature range.

For example, a second sub-system may be a security control system which regulates access to a room in the building, in which case the control devices 102, 104, 106 comprise motion sensors and various control means for detecting e.g. if personnel (try to) enter rooms or buildings without authorization.

Communication between the computer server 110, the operator devices 114, 116 and the building control devices 102, 104, 106 is per se performed in any suitable, known manner, and includes sending various kinds of signals or messages between the devices 102, 104, 106, 110, 114, 116 operatively connected to the network 108.

Thus one building control system, such as the system 100 of FIG. 1 may comprise a number of different building control sub-systems, wherein each sub-system is associated with a unique functionality. The building control system 100 may also comprise a number of different building control sub-systems, wherein each sub-system is associated with different locations, such as different buildings, different floors within a building or different rooms within one floor, etc. The building control system 100 may represent a combination of different functionalities and different locations. For example, a third sub-system may be combination of said first and said second sub-system.

An illustrative example for monitoring a building control device will now follow. Although pertaining to temperature regulation the same principles apply also to other examples for monitoring a building control device.

Assume that the building control device 102 is a heating/cooling control device which is arranged to provide heating or cooling to a first room in a building. Assume that the building control device 104 is a temperature control device which is arranged to sense the temperature in said first room in said building. Alternatively the same building control device may be capable of providing heating or cooling and sensing the temperature. Assume further that if the sensed temperature falls outside a predefined temperature interval, say if the sensed temperature is lower than 15 degrees Celsius or higher than 25 degrees Celsius, the building control device 104 is arranged to send an event message indicating that the temperature is not within the predefined temperature interval and that maintenance for the heating/cooling control device 102 may be required.

Thus if a temperature lower than 15 degrees Celsius or higher than 25 degrees Celsius is sensed by the temperature control device 104 an event message is transmitted from the temperature control device 104. The message is sent over the network 108 to the server 110, indicating that the temperature is not within the desired temperature range. Optionally, the control device 104 regularly sends to the server 110 messages indicating the measured temperature, and the server 110 determines if the temperature is within the desired range. The event message further comprises at least one parameter which at least pertains to defining the event to be either unassigned, pending, or assigned by at least one of the operator devices 114, 116.

Such a message, or the server's 110 determination that the temperature is outside the predefined interval, is an indication of malfunction or abnormal disturbance, since the control device 102 should be capable of regulating the temperature so that a desired temperature is maintained. This message sent to the server 110, or the situation determined by the server 110, is handled as an exception message which may be forwarded to and attended by an operator device, by an operator, or by service personnel.

At least one of the plurality of operator devices 114, 116 may traverse the database 112 in order to e.g. find unassigned events. If an unassigned event is detected the at least one of the plurality of operator devices 114, 116 defines the event to be pending and requests at least a second of the plurality of operator devices 114, 116 to accept assignment of the pending event. In a case the second of the plurality of operator devices 114, 116 accepts assignment of the pending event the event is defined to be assigned; in a case the second of the plurality of operator devices 114, 116 rejects assignment of the pending event the event is defined to be unassigned.

When the event message has been accepted by and assigned to one of the operator devices 114, 116, a common measure is to manually investigate and take care of the event at the control device and/or the environment the control device 102, 104, 106 is operable within.

More specifically, the exception message is commonly not forwarded directly to a human being, such as service or maintenance personnel, but to an operator device 114, 116, that is associated with the human operator that is supposed to investigate the cause of the event message. The term "associated" should here be interpreted broadly; the operator device may be associated with a human operator e.g. by being carried by, or situated in an office of, the human operator. Therefore the database 112 may hold information regarding the type of message that should be sent to which type of operator device.

The control device 102, 104, 106 detects, optionally in cooperation with the server 110, and communicates the event in any suitable, known manner. For example, sending an event message from the server 110 may be realized by sending an e-mail or a text message to the operator devices 114, 116. For example if the operator device 114 is a computer the message may be sent as an e-mail message; if the operator device 116 is a portable communications device the message may be sent as a text message. The event message may thus be individually adapted to the operator devices 114, 116. The event message may thus comprise identification information of maintenance personnel, or operators, associated with the operator devices 114, 116.

Depending on the type of event (ranging from e.g. a notification message to an alarm message) the event message may comprise more or less information. For example, in case the event pertains to a notification message only the notification may be needed. In case the event message pertains to an alarm it may be desirable to include information pertaining to the type of alarm that has been triggered and also the specific location of the alarm. Typically, the more important the event the more information is transmitted. It may also be possible to send several messages pertaining to the same event, wherein information classified as most important is transmitted in the first event message. The event message may thus be individually adapted to the event.

Figure 1B:
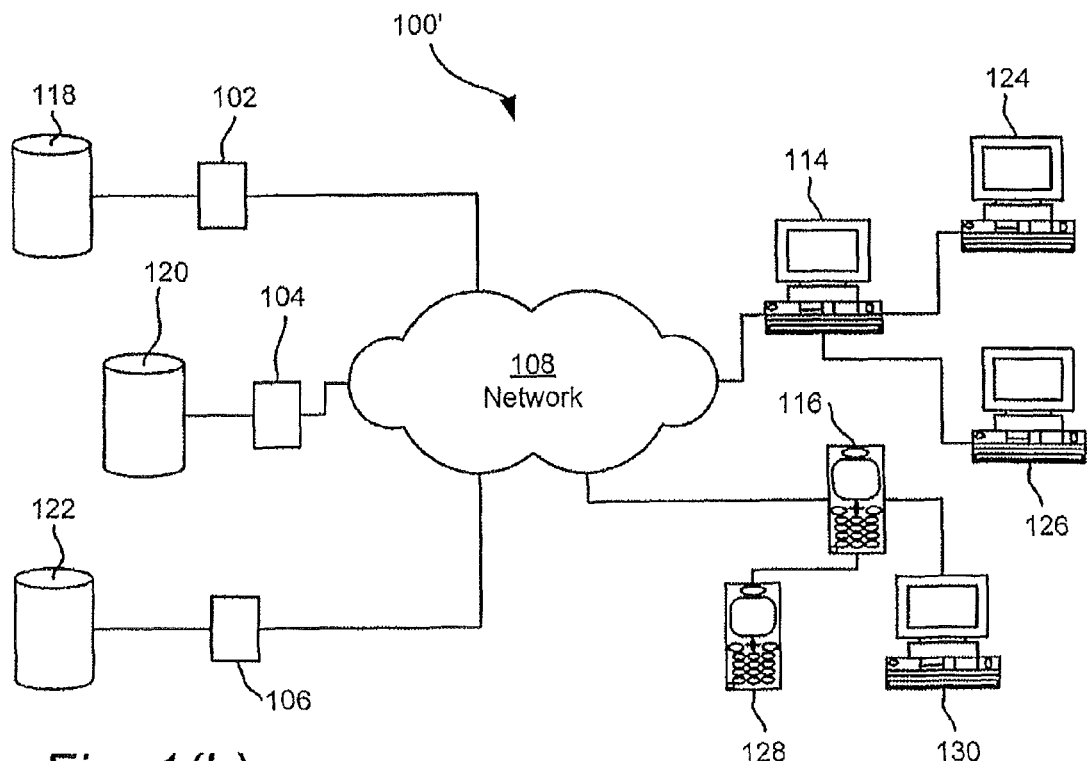
FIG. 1b is a schematic view of a system according to an embodiment.

A system 100' similar to the system 100 of FIG. 1*a* is illustrated in FIG. 1*b*. The system 100' will be described in an operating state.

Similar to the system 100 the system 100' comprises a plurality of building control devices 102, 104, 106 which are operatively connected to a communications network 108. The building control devices 102, 104, 106 are also operatively connected to databases 118, 120, 122. The databases 118, 120, 122 may communicate with each other and thereby exchange information comprised in said databases 118, 120, 122. That is, information may be distributed from one database 118, 120, 122 to the remaining databases 118, 120, 122 in the system 100'. Alternatively, as in FIG. 1*a* the building control devices 102, 104, 106 may share a common database. One of the databases 118, 120, 122 may act as a common and shared database for all building control devices 102, 104, 106 in the system 100'.

A plurality of operator devices 114, 116, 124, 126, 128, 130 are also operatively connected to the network 108. The operator devices 114, 116, 124, 126, 128, 130 may be associated with operators, such as maintenance personnel; they may be fully automated capable of handling events, or any combination thereof.

The plurality of operator devices 114, 116, 124, 126, 128, 130 may be ordered in an ordered list of devices. Such an ordered list will be further discussed with reference to FIG. 1*c* below.

Communication between the databases 118, 120, 122, the operator devices 114, 116, 124, 126, 128, 130 and the building control devices 102, 104, 106 is per se performed in any suitable, known manner, and includes sending various kinds of signals or messages between the devices 102, 104, 106, 110, 114, 116, 118, 120, 122, 124, 126, 128, 130 operatively connected to the network 108.

Figure 1C:
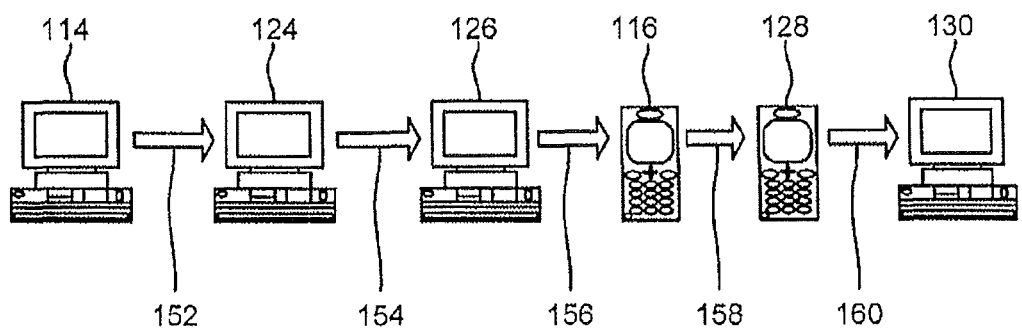
FIG. 1c is an illustration of an ordered list of operator devices according to an embodiment.

FIG. 1*c* illustrates an example of an ordered list of operator devices 114, 116, 124, 126, 128, 130. In the example of FIG. 1*c* the operator devices have been ordered as: 114, 124, 126, 116, 128, 130. The arrows 152, 154, 156, 158, 160 indicate the next operator device in the list. For example, if the operator device 124 is the current operator device in the list the next operator device is the operator device 126, as indicated by the arrow 154. That is, in a case the operator device 124 rejects assignment of an even the request for accepting the event is next transmitted to the operator device 126. The forwarding request may be transmitted e.g. from a central server, such as the server 110, from any of the databases 112, 118, 120, 122, from any of the building control devices 102, 104, 106 or any of the operator device 114, 116, 124,126, 128, 130.

The ordered list can be ordered according to a number of parameters, such as the type of event, the type of building control device 102, 104, 106, the geographical location of the event, which operator device(s) 114, 116, 124, 126, 128, 130 that have previously been assigned to the event, and so on. For example, it may be preferable that an event occurring at a building control device 102, 104, 106 located at a first level in a building is attended by operator devices 114, 116, 124, 126, 128, 130 which are located at said first level in said building. Alternatively the ordered list can be ordered according to the authority of the operator devices 114, 116, 124, 126, 128, 130. For example the operator devices 114 and 116 may be associated with a higher level of authority than the operator devices 124, 126, 128, 130. Moreover, the operator devices 124, 126 may be subordinate to the operator device 114, whilst the operator devices 128, 130 may be subordinate to the operator device 116, as indicated by the example of FIG. 1*b*. The ordered list may thus be said to reflect a hierarchical structure of the plurality of operator devices 114, 116, 124, 126, 128, 130, wherein the hierarchical structure may reflect various sub-systems in the building control system. That is, by providing such an ordered list the risk of an event to remain unassigned, or unattended is reduced since the event may handled by a next operator device 114, 116, 124, 126, 128, 130 in the list, in case a current operator device 114, 116, 124, 126, 128, 130 in the list rejects assignment of the event. The event message may thus comprise information pertaining to the ordered list. For example, information pertaining to the ordered list may comprise the number of operator devices that the event message has previously been transmitted to. Information pertaining to the ordered list may alternatively, or in addition, comprise identification information of operator devices that the event message has previously been transmitted to.

Figure 2:
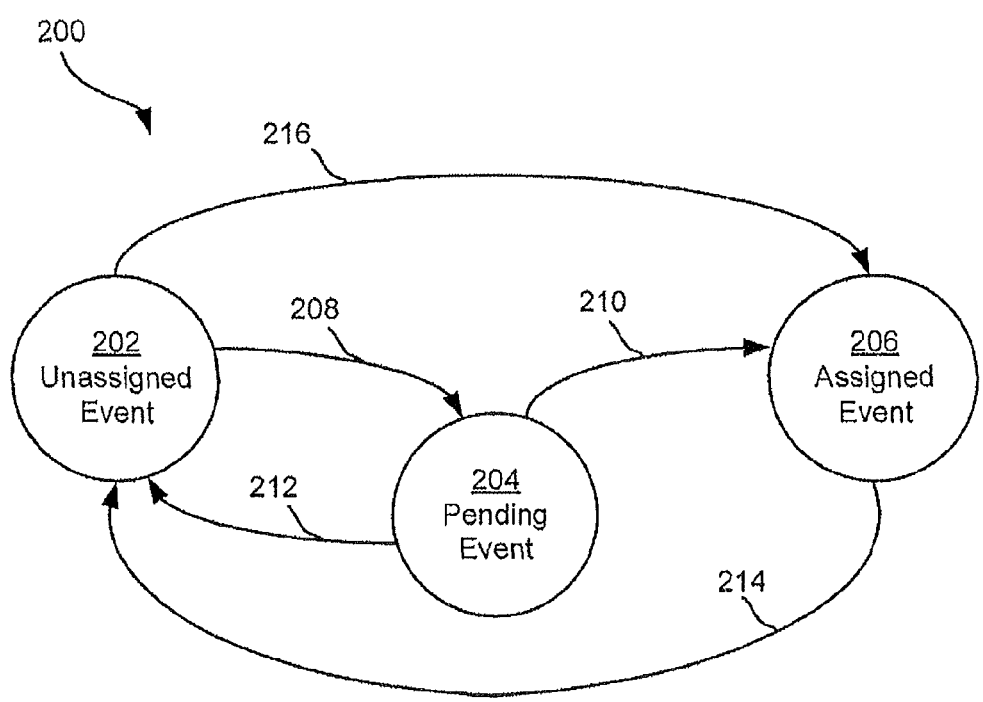
FIG. 2 is a state machine according to an embodiment.

FIG. 2 illustrates a state diagram 200 according to an embodiment. The state diagram 200 comprises a set of states 202, 204, 206 and a set of edges 208, 210, 212, 214, 216, which define the transitions to and from the states 202, 204, 206. The state diagram may be used to illustrate whether an event is unassigned, pending, or assigned to by one of the plurality of operator devices 114, 116, 124, 126, 128, 130 of FIGS. 1*a*, 1*b* or 1*c*.

The state diagram 200 thus comprises a first state 202 pertaining to a case wherein the event is unassigned, a second state 204 pertaining to a case wherein the event is pending, and a third state 206 pertaining to a case wherein the event is assigned.

For illustrative purposes and without losing generality it is assumed that the current state is the first state 202 and thus that the event is unassigned. In a case an unassigned event is detected by one of the operator devices 114, 116, 124, 126, 128, 130, as described above, the operator device 114, 116, 124, 126, 128, 130 which detects the event to be unassigned may define the event to be pending and thus the event may be associated with the second state 204 as indicated by the state transition edge 208. Alternatively the unassigned event may be self-assigned and in such a case the event is associated with the third state 206 as indicated by the state transition edge 216. In a case the pending event associated with state 204 is accepted by at least the next operator device 114, 116, 124, 126, 128, 130 the event is defined as being assigned and thus the event is associated with the third state 206 as indicated by the state transition edge 210. In a case the pending event associated with state 204 is rejected by all the next operator devices 114, 116, 124, 126, 128, 130 the event is defined as being unassigned and thus the event is associated with the first state 202 as indicated by the state transition edge 212. Finally, if an assigned event associated with the third state 206 once again becomes unassigned, the event is defined to be unassigned as indicated by the state transition 214 from the third state 206 to the first state 202. This might be the case if an operator device 114, 116, 124, 126, 128, 130 currently assigned to the event realizes that the assigned operator device 114, 116, 124, 126, 128, 130 cannot properly attend to the event.

A method for monitoring a building control device such as a building control device 102, 104, 106 of FIG. 1*a* or 1*b* will now be illustrated with reference to the flowchart of FIG. 3*a*. The building control device 102, 104, 106 is associated, in a step 302, with an event. As exemplified above the event may pertain to an indication of malfunction, an exception situation, an abnormal disturbance and/or an alarm. An event message may hold information about when, where or why the event was triggered.

The event is stored, in a step 304, together with at least one parameter of the building control device 102, 104, 106 in a database 112, 118, 120, 122. The database 112, 118, 120, 122 is operatively connected to a plurality of operator devices 114, 116, 124, 126, 128, 130. The at least one parameter at least pertains to defining the event to be either unassigned, pending, or assigned by the plurality of operator devices 114, 116, 124, 126, 128, 130. That is, if at least one of the plurality of operator devices 114, 116, 124, 126, 128, 130 has accepted the event, the event is defined as assigned. If assignment is pending the event is defined as being pending. If none of the plurality of operator devices 114, 116, 124, 126, 128, 130 thus far has accepted the event the event is defined as being unassigned. The term accepted should here be interpreted broadly; an operator devices 114, 116, 124, 126, 128 may e.g. accept the event by obliging to undertake one or more measures, such as performing maintenance or a security check, in relation to the event.

The database 112, 118, 120, 122 may be traversed, in a step 306, by at least a first of the plurality of operator devices 114, 116, 124, 126, 128, 130. The traversing operation may be performed on regular time intervals. Different operator devices 114, 116, 124, 126, 128, 130 may have different authority properties for traversing the database 112, 118, 120, 122. The term traversing should be interpreted as searching the database 112, 118, 120, 122 subject to the at least one parameter, wherein the at least one parameter may be defined as at least one search parameter. Thus the traversing operation may be defined as involving a filtering operation, wherein the at least one search parameter defines which entries, or events, in the database 112, 118, 120, 122 that should be considered. Thus whilst traversing the database 112, 118, 120, 122 only events which fulfill the at least one parameter are selected. The word traversing is thus defined to have a different meaning than the words selecting and collecting.

The at least one parameter at least pertains to whether or not the event is assigned. The at least first of the plurality of operator devices 114, 116, 124, 126, 128, 130 may thus search for all unassigned events in a building control system by traversing the entries of database 112, 118, 120, 122 subject to a search parameter "unassigned". The search may be further limited by e.g. searching for unassigned events pertaining to heating on a particular floor in a building control system.

Thus a decision is made, in a step 308, whether or not the event is unassigned.

In a case the first of the plurality of operator devices 114, 116, 124, 126, 128, 130 detects an unassigned event the event is defined, in a step 310, to be pending and at least a second of the plurality of operator devices 114, 116, 124, 126, 128, 130 is requested, in a step 312, to accept assignment of the pending event. The event is first defined to be pending in order to provide the at least a second of the plurality of operator devices 114, 116, 124, 126, 128, 130 with a reasonable response time. What is defined to be a reasonable response time may depend on the type of event that has occurred; the more severe the event, the shorter the allowed response time. For example a fire or a break-in will in most situations require immediate response, whilst the response time to an event indicating that a building control device 102, 104, 106 requires regular maintenance may be several minutes or even hours. Hence when the request message is sent the time lapsed since the request message was sent may be measured.

Thus a decision is made, in a step 314, whether or not the second of the plurality of operator devices 114, 116, 124, 126, 128, 130 has accepted assignment of the event.

In case the second of the plurality of operator devices 114, 116, 124, 126, 128, 130 accepts assignment of the pending event the event is defined, in a step 316, to be assigned; in case the second of the plurality of operator devices 114, 116, 124, 126, 128, 130 rejects assignment of the pending event the event is defined, in a step 318, to be unassigned.

Figure 3A:
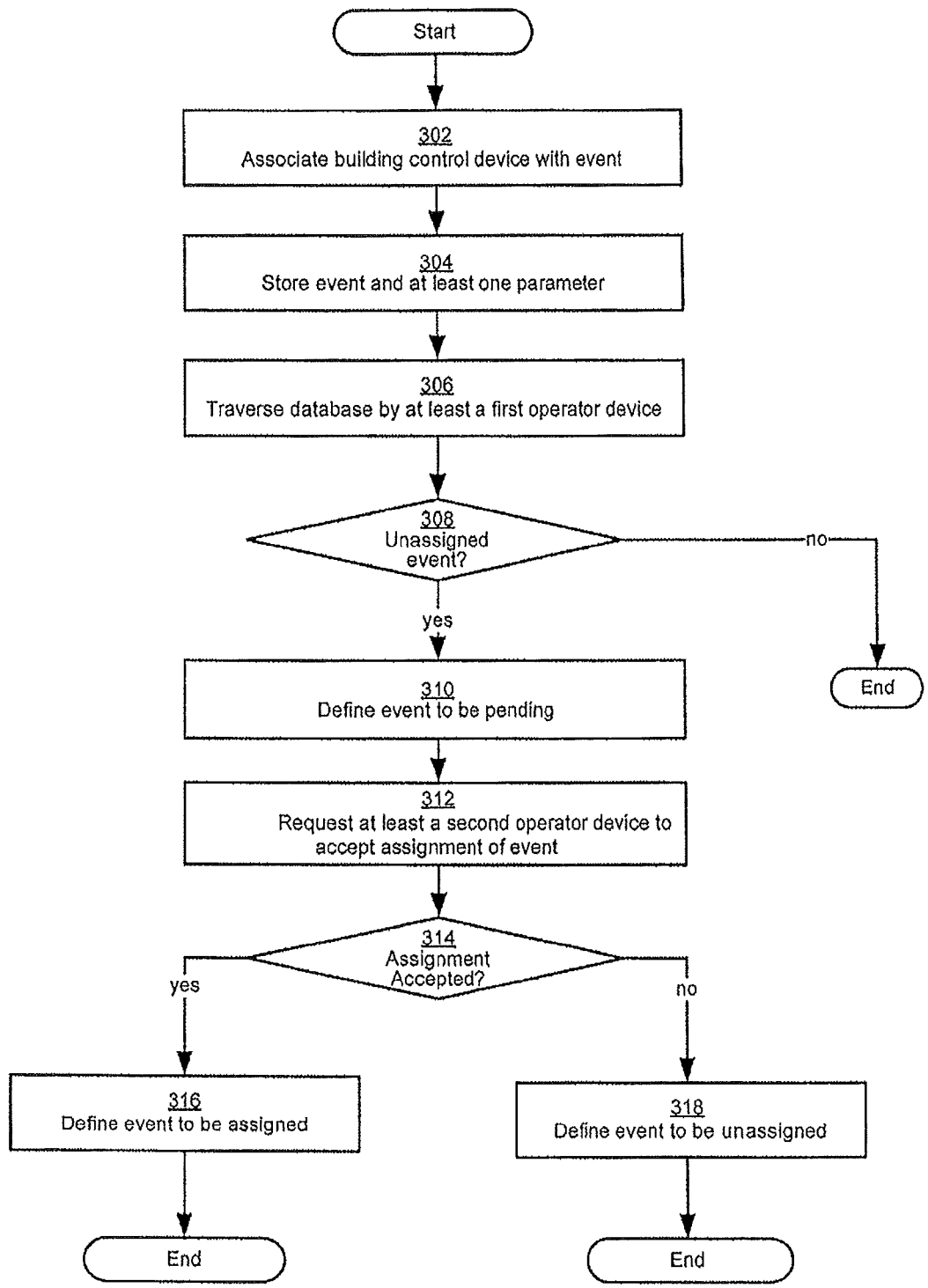
FIG. 3a is a flowchart according to an embodiment.

The method disclosed with reference to FIG. 3a may be performed by a computer program stored on a computer readable medium, comprising software instructions that can be executed in a computer. The computer may e.g. be a stationary computer, a portable computer, a portable digital assistant, a mobile phone, or the like.

A method for monitoring a building control device such as a building control device 102, 104, 106 of FIG. 1a or 1b and similar to the method of the flowchart of FIG. 3a will now be illustrated with reference to the flowchart of FIG. 3b.

As disclosed by the method of the flowchart of FIG. 3a the building control device 102, 104, 106 is associated, in a step 302, with an event. The event is then stored, in a step 304, together with at least one parameter of the building control device 102, 104, 106 in a database 112, 118, 120, 122. Further, the database 112, 118, 120, 122 may be traversed, in a step 306, by at least a first of the plurality of operator devices 114, 116, 124, 126, 128, 130 subject to at least one parameter. The at least one parameter at least pertains to whether or not the event is assigned, pending or unassigned.

Thus a decision is made, in a step 308, whether or not the event is unassigned.

The at least a first of the plurality of operator devices 114, 116, 124, 126, 128, 130 may then decide, in a step 322, to request at least a second of the plurality of operator devices 114, 116, 124, 126, 128, 130 to accept the unassigned event.

Thus, in case the event is unassigned and a decision has been made to send a request to at least a second of the plurality of operator devices 114, 116, 124, 126, 128, 130 the event is, in a step 310, defined to be pending.

In case the second of the plurality of operator devices 114, 116, 124, 126, 128, 130 rejects assignment of the pending event the plurality of operator devices 114, 116, 124, 126, 128, 130 may further be ordered, in a step 322, in an ordered list of additional devices, wherein the ordered list may reflect a hierarchical structure of the plurality of operator devices 114, 116, 124, 126, 128, 130. Such an ordered list has been disclosed with reference to FIG. 2 above.

Alternatively, the plurality of operator devices 114, 116, 124, 126, 128, 130 may be ordered in an ordered list of additional devices prior to sending the request to the second of the plurality of operator devices 114, 116, 124, 126, 128, 130. Hence in this case the second of the plurality of operator devices 114, 116, 124, 126, 128, 130 is included in the ordered list of additional devices.

In case the second of the plurality of operator devices 114, 116, 124, 126, 128, 130 rejects assignment of the pending event a third of the plurality of operator devices 114, 116, 124, 126, 128, 130 may be assigned to be a current device, wherein the third of the plurality of operator devices 114, 116, 124, 126, 128, 130 is the next device following the second of the plurality of operator devices 114, 116, 124, 126, 128, 130 in the ordered list. An operator identification parameter of the current device may also be associated with the pending event.

The request pertaining to acceptance of the pending event may then be transmitted, in a step 324, to the current device associated with the current operator identification parameter.

Thus a decision may be made, in a step 314, whether or not the event is unassigned.

While the current device rejects assignment of the pending event and the end of the list is not reached, in a step 326, the next device in the ordered list of additional devices may be assigned to be the current device and the operator identification parameter of the current device is associated with the message. That is, in a pseudo-code this can be written as:

Previous device:=current device;
Current device:=next device.

The request pertaining to acceptance of the pending event may then be transmitted, in a step 324, to the current device associated with the current operator identification parameter.

This process may continue until one of the plurality of operator devices 114, 116, 124, 126, 128 accepts assignment of the event. If the end of the list is reached the request may be transmitted to the first of the plurality of operator devices 114, 116, 124, 126, 128 in the ordered list. Alternatively, the event may remain to be unassigned until a further operator device 114, 116, 124, 126, 128 traverses the database 112, 118, 120, 122.

The method for monitoring a building control device, such as a building control device 102, 104, 106 of FIG. 1*a* or 1*b*, may further comprise a number of additional steps that will be described next. The method may for example comprise associating the pending event with a predetermined condition parameter. The predetermined condition may further comprise a lapsed time interval. Thus when the event message is sent to a first of the plurality of operator devices 114, 116, 124, 126, 128 the time lapsed since the event message was sent starts being measured. The lapsed time may e.g. be measured by the building control device 102, 104, 106, the server 110 or the database 112, 118, 120, 122. The operator device 114, 116, 124, 126, 128 receiving the message regarding acceptance of the pending event may send a confirmation message to the database 112, 118, 120, 122, the building control device 102, 104, 106 associated with the event, or the server 110, which message indicates whether the operator device 114, 116, 124, 126, 128 accepts or rejects assignment of the pending event. This allows (a first operator of) a first operator device, to redirect the message to (a second operator of) a second operator device.

Information comprising the operator's acceptance or rejection of the pending event may further be stored in the database 112, 118, 120, 122, in the building control device 102, 104, 106 associated with the event, or in the server 110. The information may further comprise the date and time of the acceptance or rejection. Storing such information provides for efficient handling of messages. For example, if an operator device 114, 116, 124, 126, 128 has rejected acceptance of the event the request for acceptance should not be sent again to this operator devices within a specific time frame.

Thus if the first of the plurality of operator devices 114, 116, 124, 126, 128 does not respond to the event by accepting the requested assignment within the predetermined lapsed time interval, the event message is forwarded to the second of the plurality of operator devices 114, 116, 124, 126, 128. Thus the alarm message may be sent to a second operator device 114, 116, 124, 126, 128 if the first operator device 114, 116, 124, 126, 128, for example, does not attend to the event within a specific time. This is advantageous in that the risk of an event being unassigned, or unattended to for a longer period of time is reduced.

If information comprising the association of the operator identification parameter with the pending event is stored, e.g. in the database 112, 118, 120, 122, efficient handling of messages is provided. In addition, such information can be used later when a new event occurs at the building control device 102, 104, 106 to which the pending event pertains. At least one of the plurality of operator devices 114, 116, 124, 126, 128 may send a message indicative of measures taken in relation to the event to e.g. the database 112, 118, 120, 122. Information indicative of the measures taken may further be stored in e.g. the database 112, 118, 120, 122. This provides for a later analysis of how the event associated with the messages has been handled.

The message may be displayed only on a communication device associated with an identification parameter that was associated with the message. The communication device may receive the message as a text message, an e-mail message, a synthetic voice message, or the like.

The identification parameter may thus be associated with the operator device of the plurality of operator devices 114, 116, 124, 126, 128, 130, which has received the request to accept assignment of the pending event. This means that events may be hidden from operators, operator devices 114, 116, 124, 126, 128, 130 or other devices which are not associated with handling the event. This reduces the information flow in the system 100, 100', since messages pertaining to the pending event do not need to be communicated to all devices in the system 100, 100'.

The association of the first operator identification parameter with the message may be monitored until the pending event is assigned. This allows for connecting the event associated with the messages with an operator as long as the event is unattended to or unassigned.

Figure 3B:
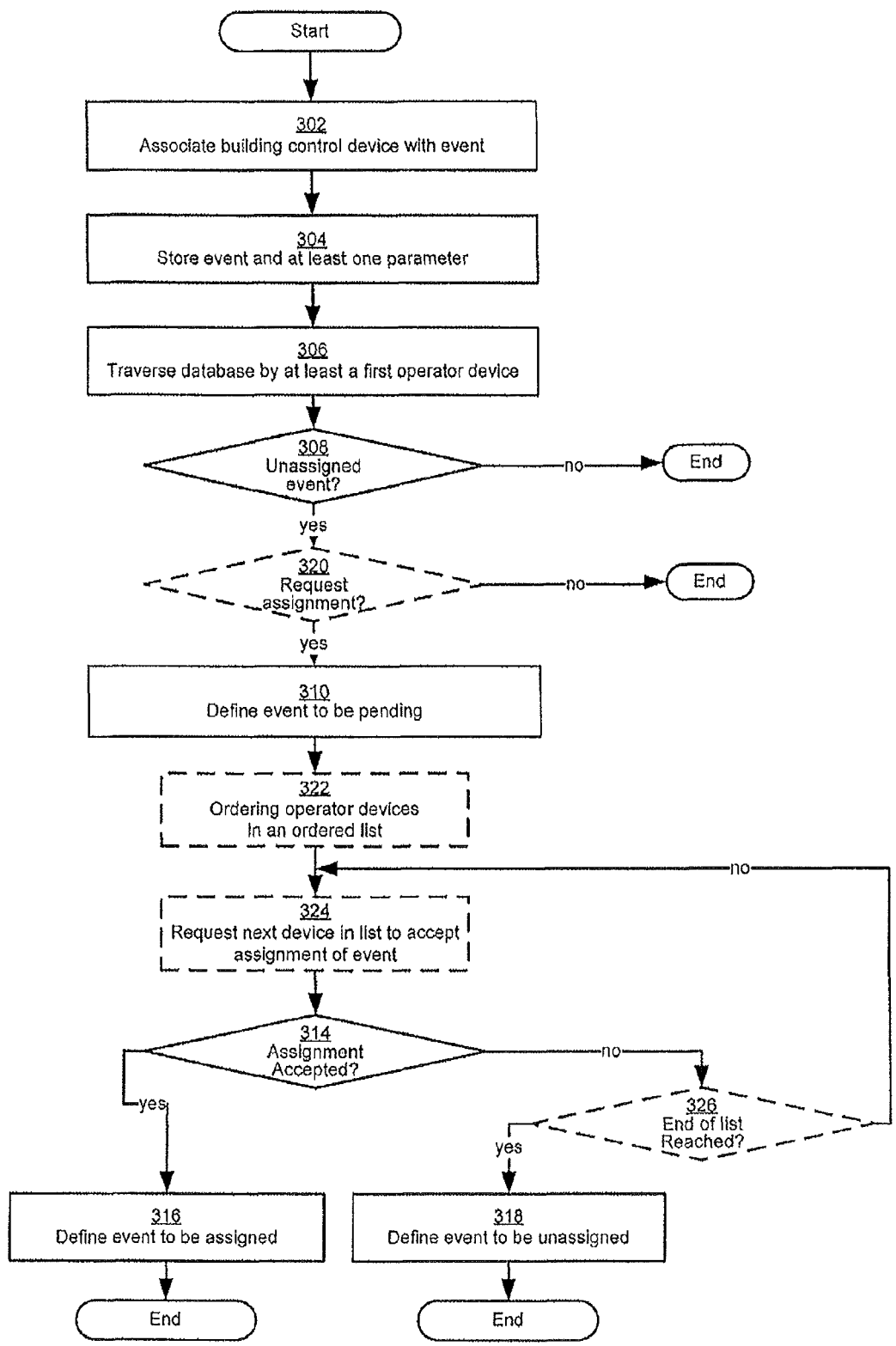
FIG. 3b is a flowchart according to an embodiment.

The method disclosed with reference to FIG. 3*b* may be performed by a computer program stored on a computer readable medium, comprising software instructions that can be executed in a computer. The computer may e.g. be a stationary computer, a portable computer, a portable digital assistant, a mobile phone, or the like.

Figure 3C:
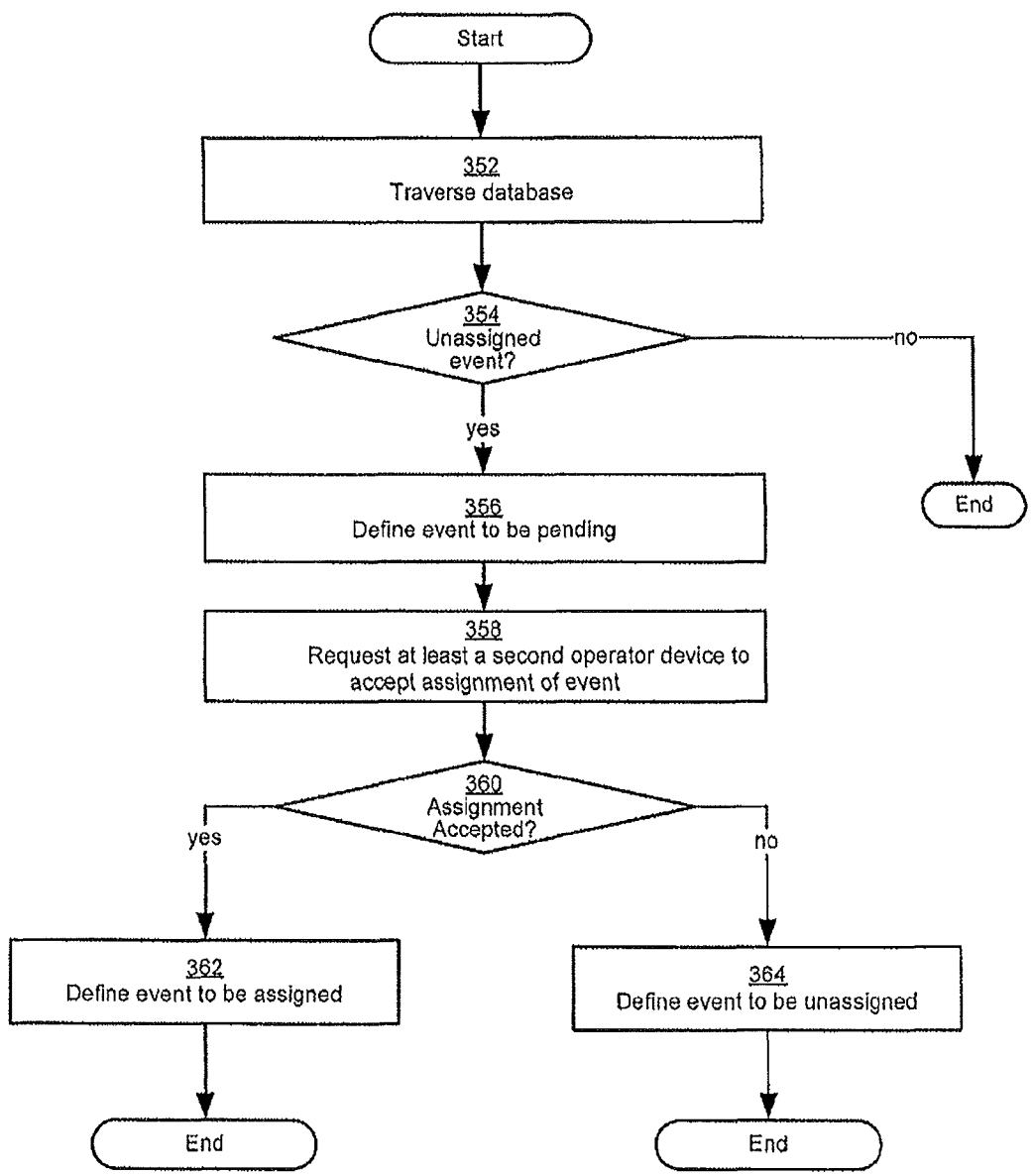
FIG. 3c is a flowchart according to an embodiment.

A method in a first operator device 114, 116, 124, 126, 128, 130 for monitoring a building control device 102, 104, 106, such as a building control device 102, 104, 106 of the systems 100 or 100' of FIGS. 1*a* and 1*b*, will now be disclosed with reference to the flowchart of FIG. 3*c*.

The building control device 102, 104, 106 is associated, in a step 352, with an event.

The event and at least one parameter of the building control device 102, 104, 106 are then stored, in a step 354, in a database 112, 118, 120, 122. The at least one parameter at least pertains to defining the event to be one from the group of unassigned, pending, or assigned by the plurality of operator devices 114, 116, 124, 126, 128, 130. As in the systems 100 or 100' of FIG. 1*a* or 1*b* the database 112, 118, 120, 122 is operatively connected to a plurality of operator devices 114, 116, 124, 126, 128, 130.

The first operator device 114, 116, 124, 126, 128, 130 then traverses, in a step 352, the database 112, 118, 120, 122 subject to the at least one parameter. The at least one parameter at least pertains to whether or not the event is unassigned, pending or assigned. The at least first of the plurality of operator devices 114, 116, 124, 126, 128, 130 may thus search for all unassigned events in a building control system by traversing the entries of database 112, 118, 120, 122 subject to a search parameter, wherein the search parameter e.g. may be the word "unassigned".

Thus a decision is made, in a step 354, by the first operator device 114, 116, 124, 126, 128, 130 whether or not the event is unassigned.

In case an unassigned event is detected by the first operator device 114, 116, 124, 126, 128, 130 the event is defined, in a step 356, to be pending.

The first operator device 114, 116, 124, 126, 128, 130 then requests, in a step 358, at least a second of the plurality of operator devices to accept assignment of the pending event.

Thus a decision is made, in a step 360, whether or not the assignment has been accepted by any one of the plurality of operator device 114, 116, 124, 126, 128, 130.

In a case the second of the plurality of operator devices accepts assignment of the pending event the event is defined, in a step 362, to be assigned.

In a case the second of the plurality of operator devices rejects assignment of the pending event the event is defined, in a step 364, to be unassigned.

In general the method disclosed with reference to FIG. 3c may further comprise additional steps as disclosed with reference to FIGS. 3a and 3b, mutatis mutandis.

The method disclosed with reference to FIG. 3c may be performed by a computer program stored on a computer readable medium, comprising software instructions that can be executed in a computer. The computer may e.g. be a stationary computer, a portable computer, a portable digital assistant, a mobile phone, or the like.

FIG. 4 illustrates the data structure of an event message associated with any of the plurality of building control devices 102, 104, 106, which structure comprises a device identification parameter from which the building control device 102, 104, 106 that detected the event may be identified. The data structure may further comprise a type indicating type of event (e.g. temperature is too high, temperature is too low etc.), a time indicating at which point in time the event was detected by the building control device 102) 104, 106 and a status indicating whether the cause of the event has been assigned, is pending, or is still unassigned.

The structure may hold data for at least a first and a second operator device 114, 116, 124, 126, 128, 130, which each in turn hold information regarding an (operator of an) operator device identification parameter for determining a specific operator, a time indicating when the event message was sent to the first operator device, and a response indicating if the event message was accepted, rejected or not responded to by the first operator device, and vice versa for the second operator device.

The event message structure as exemplified in FIG. 4 may comprise more (or less) information than exemplified. The event message structure may be represented by any other suitable data structure, such as connected data tables, dynamic variables or object oriented classes. The event messages may be shared between the building control devices 102, 104, 106 as in the system 100 of FIG. 1 a and/or between the databases 118, 120, 122 of the building control devices 102, 104, 106 as in the system 100' of FIG. 1b.

Data which identifies at least a first operator device 114, 116, 124, 126, 128, 130 is advantageously associated with the event message.

It will be appreciated that a person skilled in the art can modify the above-described embodiments in many ways and still use the advantages of the invention as shown in the embodiments above. Thus, the invention should not be limited to the shown embodiments but should only be defined by the appended claims.

The invention claimed is:

1. A method for monitoring a building control device, the method comprising
    associating the building control device with an event;
    storing the event and at least one parameter of the building control device in a database, wherein the database is operatively connected to a plurality of operator devices, and wherein the at least one parameter at least pertains to defining the event to be one from the group of unassigned, pending, or assigned by the plurality of operator devices;
    traversing, by at least a first of the plurality of operator devices, the database subject to the at least one parameter; and
    in a case the first of the plurality of operator devices detects an unassigned event:
        defining the event to be pending;
        requesting at least a second of the plurality of operator devices to accept assignment of the pending event;
        in a case the second of the plurality of operator devices accepts assignment of the pending event defining the event to be assigned; and
        in a case the second of the plurality of operator devices rejects assignment of the pending event defining the event to be unassigned.

2. The method according to claim 1, wherein in a case the second of the plurality of operator devices rejects assignment of the pending event, the method further comprises
    ordering the plurality of operator devices in an ordered list of additional devices, wherein the ordered list reflects a hierarchical structure of the plurality of operator devices;
    assigning a third of the plurality of operator devices to be a current device, wherein the third of the plurality of operator devices is the next device following the second of the plurality of operator devices in the ordered list, and associating an operator identification parameter of the current device with the pending event;
    sending the message and the request pertaining to acceptance of the pending event from the second of the plurality of operator devices to the current device associated with the current operator identification parameter; and
    while the current device rejects assignment of the pending event:
        assigning the current device to be a previous device;
        assigning the next device in the ordered list of additional devices to be the current device and associating the operator identification parameter of the current device with the message; and
        sending the message and the request pertaining to acceptance of the pending event from the previous device to the current device.

3. The method according to claim 1, further comprising associating the pending event with a predetermined condition parameter.

4. The method according to claim 3, wherein the predetermined condition parameter comprises a lapsed time interval.

5. The method according to claim 1, further comprising sending, from at least one of the plurality of operator devices, a message indicative of at least one from the group of an operator's acceptance of the pending event, and an operator's rejection of the pending event, to the database.

6. The method according to claim 5, further comprising storing, in the database, information comprising the operator's acceptance or rejection of the pending event.

7. The method according to claim 2, further comprising storing, in the database, information comprising the association of the operator identification parameter with the pending event.

8. The method according to claim 7, further comprising displaying the message only on the at least one of the plurality of operator devices which is associated with the operator identification parameter associated with the message.

9. The method according to claim 7, further comprising monitoring the association of the first operator identification parameter with the message, until the pending event is assigned.

10. The method according to claim 1, further comprising sending, from at least one of the plurality of operator devices, a message indicative of measures taken in relation to the event, to the database.

11. The method according to claim 10, further comprising storing, in the database, information indicative of the measures taken.

12. The method according to claim 1, wherein the message is represented by a data structure comprising at least one from the group of the operator identification parameter, a reference to the operator identification parameter, and a pointer to the operator identification parameter.

13. A computer program stored on a computer readable medium, comprising software instructions that, when executed in a computer, performs a method according to claim 1.

14. The method according to claim 2, further comprising associating the pending event with a predetermined condition parameter.

15. The method according to claim 2, further comprising sending, from at least one of the plurality of operator devices, a message indicative of at least one from the group of an operator's acceptance of the pending event, and an operator's rejection of the pending event, to the database.

16. The method according to claim 3, further comprising sending, from at least one of the plurality of operator devices, a message indicative of at least one from the group of an operator's acceptance of the pending event, and an operator's rejection of the pending event, to the database.

17. The method according to claim 4, further comprising sending, from at least one of the plurality of operator devices, a message indicative of at least one from the group of an operator's acceptance of the pending event, and an operator's rejection of the pending event, to the database.

18. The method according to claim 8, further comprising monitoring the association of the first operator identification parameter with the message, until the pending event is assigned.

19. A method in a first operator device for monitoring a building control device, wherein the building control device is associated with an event, the event and at least one parameter of the building control device is stored in a database, the database is operatively connected to a plurality of operator devices, and wherein the at least one parameter at least pertains to defining the event to be one from the group of unassigned, pending, or assigned by the plurality of operator devices, the method comprising traversing the database subject to the at least one parameter; and in a case an unassigned event is detected:
  defining the event to be pending;
  requesting at least a second of the plurality of operator devices to accept assignment of the pending event;
  in a case the second of the plurality of operator devices accepts assignment of the pending event defining the event to be assigned; and
  in a case the second of the plurality of operator devices rejects assignment of the pending event defining the event to be unassigned.

20. A computer program stored on a computer readable medium, comprising software instructions that, when executed in a computer, performs a method according to claim 19.

* * * * *